United States Patent
Fang et al.

(10) Patent No.: US 10,075,344 B2
(45) Date of Patent: Sep. 11, 2018

(54) DYNAMIC RESOURCES PLANNING MECHANISM BASED ON CLOUD COMPUTING AND SMART DEVICE

(71) Applicant: Quanta Computer Inc., Taoyuan (TW)

(72) Inventors: Tien-Chin Fang, Taoyuan (TW);
Chen-Chung Lee, Taoyuan (TW);
Ping-Chi Lai, Taoyuan (TW);
Chia-Hung Lin, Taoyuan (TW);
Ming-Jen Chen, Taoyuan (TW);
Wei-Lun Tsai, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 187 days.

(21) Appl. No.: 15/012,040

(22) Filed: Feb. 1, 2016

(65) Prior Publication Data
US 2017/0126504 A1 May 4, 2017

(30) Foreign Application Priority Data
Nov. 2, 2015 (TW) .............................. 104135993 A

(51) Int. Cl.
*G06F 15/16* (2006.01)
*H04L 12/24* (2006.01)
(Continued)

(52) U.S. Cl.
CPC ............ *H04L 41/12* (2013.01); *H04L 41/145* (2013.01); *H04L 43/0817* (2013.01);
(Continued)

(58) Field of Classification Search
CPC ... H04L 41/12; H04L 41/145; H04L 43/0817; H04L 47/783; H04L 67/10; H04L 67/34
See application file for complete search history.

(56) References Cited

U.S. PATENT DOCUMENTS 9,032,077 B1 * 5/2015 Klein ...................... H04L 29/08
370/395.21
2013/0067090 A1 * 3/2013 Batrouni ............. H04L 67/1097
709/226

(Continued)

FOREIGN PATENT DOCUMENTS

| TW | 201317910 | 5/2013 |
|----|-----------|--------|
| TW | I 498029  | 8/2015 |

OTHER PUBLICATIONS

Chinese language office action dated Oct. 27, 2016, issued in application No. TW 104135993.

*Primary Examiner* — Jonathan A Bui
(74) *Attorney, Agent, or Firm* — McClure, Qualey & Rodack, LLP

(57) ABSTRACT

A dynamic resource management method for remote management of resources of resources devices by a cloud server is provided. The method includes: detecting resource-using-statuses of the resource devices to generate using-load parameters for the resources devices according to the resource-using-statuses of the resources devices by control devices installed on the resources devices; timely collecting, by the cloud server, the using-load parameters for the resources devices outputted by the control devices via a network; and upon receiving a using request corresponding to the resources devices from at least one smart device, performing, by the cloud server, a comparison according to the using-load parameters for the resources devices and the using request and performing resource using distribution on the resources devices to obtain resource-use planning based on the comparison result, thereby controlling the operation of the resource devices and replying to the using request of the smart device.

8 Claims, 3 Drawing Sheets

(51) Int. Cl.
*H04L 12/911* (2013.01)
*H04L 29/08* (2006.01)
*H04L 12/26* (2006.01)

(52) U.S. Cl.
CPC ............ *H04L 47/783* (2013.01); *H04L 67/10* (2013.01); *H04L 67/34* (2013.01)

(56) References Cited

U.S. PATENT DOCUMENTS

| | | | | |
|---|---|---|---|---|
| 2013/0097319 | A1* | 4/2013 | Ahmad | G06F 9/5033 709/226 |
| 2014/0229221 | A1* | 8/2014 | Shih | G06Q 10/06313 705/7.23 |
| 2014/0380048 | A1* | 12/2014 | He | H04L 63/083 713/168 |
| 2015/0026346 | A1* | 1/2015 | Yoon | H04L 47/70 709/226 |
| 2015/0067803 | A1* | 3/2015 | Alduaiji | G06F 21/31 726/7 |
| 2015/0154840 | A1* | 6/2015 | Black | G08B 13/19684 348/143 |
| 2015/0172115 | A1* | 6/2015 | Nguyen | H04L 67/10 709/226 |
| 2015/0381553 | A1 | 12/2015 | Rajakarunanayake et al. | |
| 2016/0125330 | A1* | 5/2016 | Borah | G06Q 10/0633 705/7.27 |
| 2016/0142338 | A1* | 5/2016 | Steinder | H04L 41/0813 709/226 |
| 2016/0226791 | A1* | 8/2016 | Ramamoorthy | H04L 47/783 |
| 2016/0266962 | A1* | 9/2016 | Rajasekharan | G06F 11/0793 |
| 2016/0301624 | A1* | 10/2016 | Gonzalez | G06F 9/5083 |
| 2016/0316003 | A1* | 10/2016 | Snider | H04L 67/1002 |
| 2016/0323377 | A1* | 11/2016 | Einkauf | H04L 67/1076 |

* cited by examiner

DYNAMIC RESOURCES PLANNING MECHANISM BASED ON CLOUD COMPUTING AND SMART DEVICE

CROSS REFERENCE TO RELATED APPLICATIONS

This application claims priority of Taiwan Application No. 104135993, filed on Nov. 2, 2015, and the entirety of which is incorporated by reference herein.

BACKGROUND OF THE INVENTION

Field of the Invention

The invention generally relates to dynamic resource management systems and methods thereof, and more particularly, to dynamic resource management systems and methods thereof based on cloud computing.

Description of the Related Art

In recent years, with the rapid technological advances made to increase resource acquisition pipelines, people waiting for a resource request and communication problems caused by the consumption of time and cognitive differences, but not with the advancement of technology has been effectively improved, such as efficiency and energy conservation issues, inability to carryout real-time feedback of information and limited information delivery problems and so on.

BRIEF SUMMARY OF THE INVENTION

Dynamic resource management systems and methods thereof are provided.

An embodiment of the invention provides a dynamic resource management method for remote management of resources of resources devices by a cloud server is provided. The method comprises the steps of: detecting resource-using-statuses of the resource devices to generate using-load parameters for the resources devices according to the resource-using-statuses of the resources devices by control devices installed on the resources devices; timely collecting, by the cloud server, the using-load parameters for the resources devices outputted by the control devices via a network; and upon receiving a using request corresponding to the resources devices from at least one smart device, performing, by the cloud server, a comparison according to the using-load parameters for the resources devices and the using request and performing resource using distribution on the resources devices to obtain resource-use planning based on the comparison result, thereby controlling the operation of the resource devices and replying to the using request of the smart device.

Another embodiment of the present invention provides a dynamic resource management system, including at least one smart device, a cloud server and a plurality of resource devices. The resource devices provide a plurality of resources, wherein each of the resource devices includes a control device installed thereon to detect resource-using-statuses of the resources devices to generate using-load parameters for the resource devices according to the resource-using-statuses of the resource devices. The cloud server which is coupled to the smart device and the resource devices via a network can remotely manage the resources of the resources devices, wherein the cloud server is configured to timely collect the using-load parameters for the resource devices outputted by the control devices via the network and upon receiving a using request for use of resources corresponding to the resource devices from the at least one smart device, perform a comparison according to the using-load parameters for the resource devices and the using request and perform a resource using distribution on the resource devices to obtain a resource-use planning based on the comparison result, thereby controlling the operation of the resource devices and replying to the using request of the smart device via the network, wherein the comparison corresponds to a plurality of impact factors that affect access to the resource devices.

Dynamic resource management methods may be practiced by the disclosed apparatuses or systems which are suitable firmware or hardware components capable of performing specific functions. Image processing methods may also take the form of a program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Embodiment of the invention provides dynamic resource management systems and dynamic resource management methods to manage resources of multiple resource devices and to coordinate and plan using requests and responses to requests from all sides for the use of resources. Requests and a large amount of information analysis among different resource devices can be handled through the use of smart devices and cloud computing, thereby finding the best resource distribution model and timely feedback on user end and server end status. Therefore, the current resource acquisition method can be changed to reduce resource waste and increase the amount of information obtained within the shortest possible time.

Figure 1:
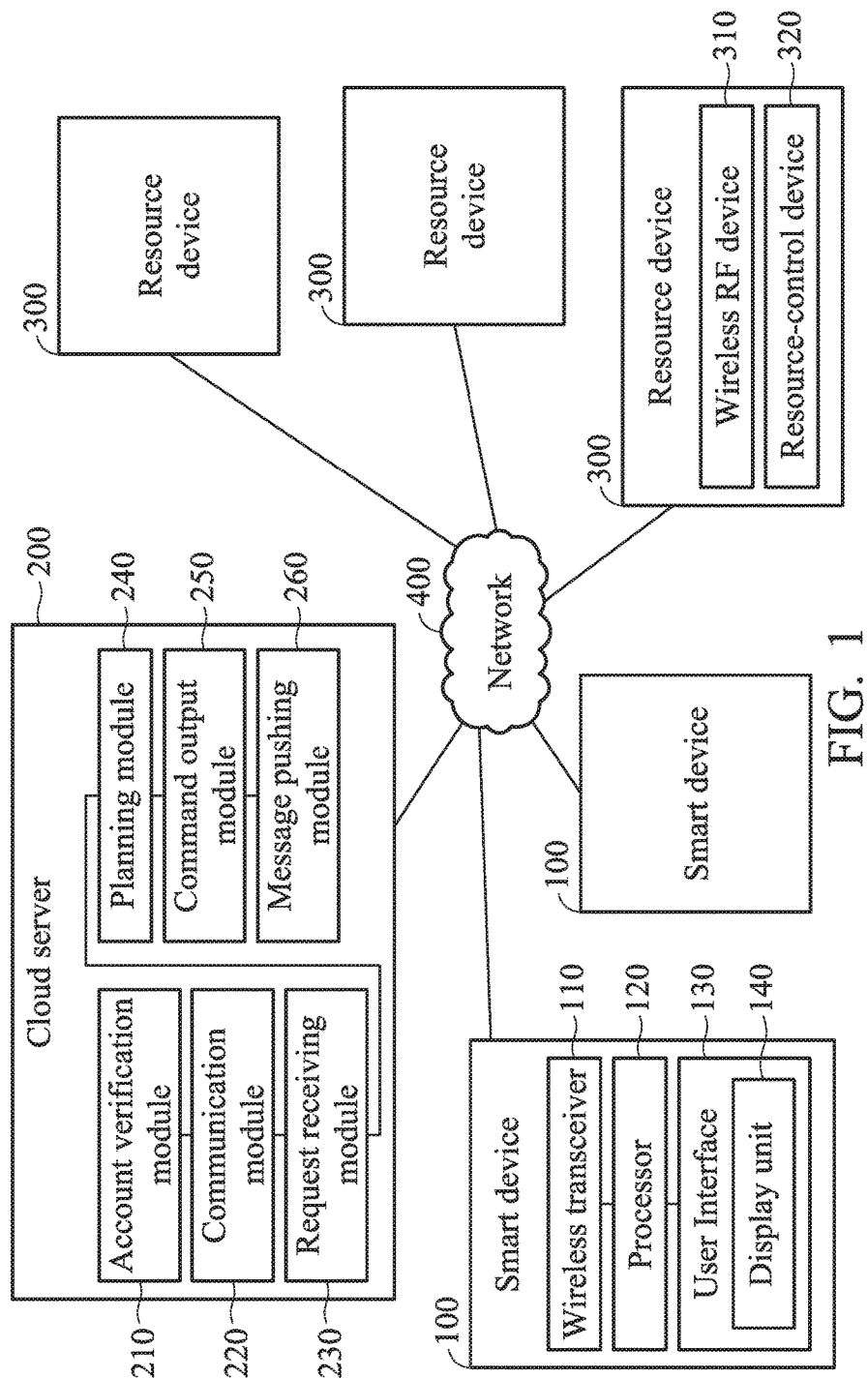
FIG. 1 is a schematic diagram illustrating an embodiment of a dynamic resource management system of the invention.

FIG. 1 is a schematic diagram illustrating an embodiment of a dynamic resource management system of the invention. As shown in FIG. 1, the dynamic resource management system 10 includes at least one or more smart devices 100, a cloud server 200 and one or more resource devices 300.

The smart device 100 may be a portable device, or other types of wireless devices having wireless communication capabilities, such as PDAs (Personal Digital Assistants), smartphones, smart devices, MIDs (Mobile Internet Devices), laptop computers, car computers, digital cameras, multi-media players, gaming devices, or any other type of mobile computational devices, however it should be understood that the invention is not limited thereto. The smart device 100 may through a network 400, such as a wired network, such as the Internet, and/or a wireless network, such as WCDMA network, 3G network, Wireless Local Area Network (WLAN), Bluetooth or other wireless network to connect to the cloud server 200 for performing wireless communications and data transmission between each other through the cloud server 200.

The smart device 100 at least comprises a wireless transceiver 110, a processor 120 and a user interface. The wireless transceiver 110 may comprise a baseband unit (not shown) and a radio frequency (RF) unit (not shown). The baseband unit may contain multiple hardware components to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communications system, wherein the radio frequency may be 900 MHz, 1900 MHz, or account verification module 2100 MHz utilized in WCDMA systems, or may be 900 MHz, account verification module 2100 MHz, or 2.6 GHz utilized in LTE systems, or others depending on the radio access technology (RAT) in use. The processor 120 may further control the operation of the wireless transceiver 110 and other functional components, such as a screen unit and/or keypad serving as the MMI (man-machine interface), a storage unit (not shown) storing the program codes of applications or communication protocols, or others. The storage unit may be any types of data storage such as a built-in memory, or an external memory card, which stores any type of data. In some embodiments, the smart device 100 may further comprise a display unit 140, which can display related data, such as the user interface 130, texts, figures, interfaces, and/or information. In some embodiments, the display unit 140 may be a screen integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. Accordingly, users are able to input commands or signals via the display unit 140.

The processor 120 which is coupled to the wireless transceiver 110 can perform the dynamic management method of the present invention, which will be discussed further in the following paragraphs. More particularly, the processor 120 can be one or more data processor(s), graphics processing units (GPU) and/or Central Processing Unit(s) (CPU), which may be used to execute one or more types of computer-readable mediums stored within the storage devices (not shown) such as a memory.

The cloud server 200 may include at least an account verification module 210, a communication module 220, a request receiving module 230, a planning module 240, a command output module 250 and a message pushing module 260. The account verification module 210 is responsible for verifying the authorization of users that have made requests to use the said resources. When a request for use is received from a smart device, the identification of the user will be verified by the account verification module 210 to determine whether or not the smart device user has authorization to use the resources in the resource devices. If the user is not authorized to do so, the account verification module 210 rejects the request for use or executes a registration procedure. If the verification result indicates that the user account is a legitimate account, the mobile app function will be activated; similarly, if the verified result indicates that the user account is an illegitimate account, the user will be guided to the registration page or the mobile app will be closed. The request receiving module 230 can be used when a user makes a request for use of resources. All the requests can be summarized and filtered to confirm the legitimacy of the requests by the request receiving module 230. The filtered requests can then be sent to the planning module 240. The planning module 240 can analyze all resource requests and the statuses of various resources for each resource device to plan the best model for effective resource access at the user end and send the planned results to the command output module 250. In some embodiments, the cloud server 200 may further include a database (not shown), which is used to store relevant information, such as resource-related information for different resource devices, needs and resource use status filtered and so on.

The command output module 250 can convert the planned results planned by the planning module 240 into commands, which can be sent to a resource-control device 320 in respective resource device 300 through the network 400, allowing the resource-control device 320 to interpret and execute the action corresponding to the command.

The message pushing module 260 can be used to deliver messages of user action results to the smart devices 100 through push technology based on the planned resource use of the planning module 240.

The one or more resource devices 300 may provide a plurality of limited resources. Each resource device 300 may include a wireless radio frequency (RF) device 310 and a resource-control device 320, in which the wireless RF device 310 may through the network 400, such as a wired network, such as the Internet, and/or a wireless network, such as WCDMA network, 3G network, WLAN, Bluetooth or other wireless network to connect to the cloud server 200 for communication or to be paired with the smart devices 100 within its signal transmission range. The wireless RF device 310 may further comprise a wireless signal transmission module, which can readily deliver wireless signals containing information of the location of resources and the statuses of relevant resources according to prescribed time intervals. The resource-control device 320 may detect the resource using status of the resource device 300 and generate related using-load parameters of the resource device 300 based on the resource using status of the resource device 300 detected and periodically report it to the cloud server 200. The resource-control device 320 may also perform resource control in the resource device 300 to enable the resource device 300 to perform corresponding operations, such as Open or Close, based on corresponding commands output by the command output module 250.

The wireless transceiver 110 of the smart device 100 is responsible for receiving signals transmitted by the resource devices 300, and when a resource device 300 receives the corresponding signal, it will automatically notify the smart device 100. Specifically, the wireless RF device 310 of each resource device 300 is installed within a fixed range of each resource device 300, and the wireless RF device 310 may periodically broadcast signals in a fixed time, such as, the signal may include a unique device identification code, such as the Universal Unique Identifier (UUID), for the cloud server 200 to identify the type and the location of the resource device corresponding to the wireless RF device. When a user handhelds a smart device 100 (e.g., a mobile device) near the wireless RF device 310 of resource device 300 and enters into its signal coverage range, the wireless transceiver 110 of the smart device 100 and the wireless RF device 310 can detect each other such that the smart device 100 may receive signals from the wireless RF device 310, and determine the content of its signal, in which the signal content may include the UUID of the resource device. Once that UUID obtained from the signal content has been previously defined in the mobile app, the processor 120 of the smart device 100 immediately starts the default user interface 130 such as a mobile App to automatically connect to the cloud server 200 for performing dynamic resource management method of the present invention.

It should be understood by those skilled in the art that various devices and modules and other components of the present invention may have sufficient hardware circuits, components and/or with the software, firmware, and combination thereof to achieve the desired functionalities.

Figure 2:
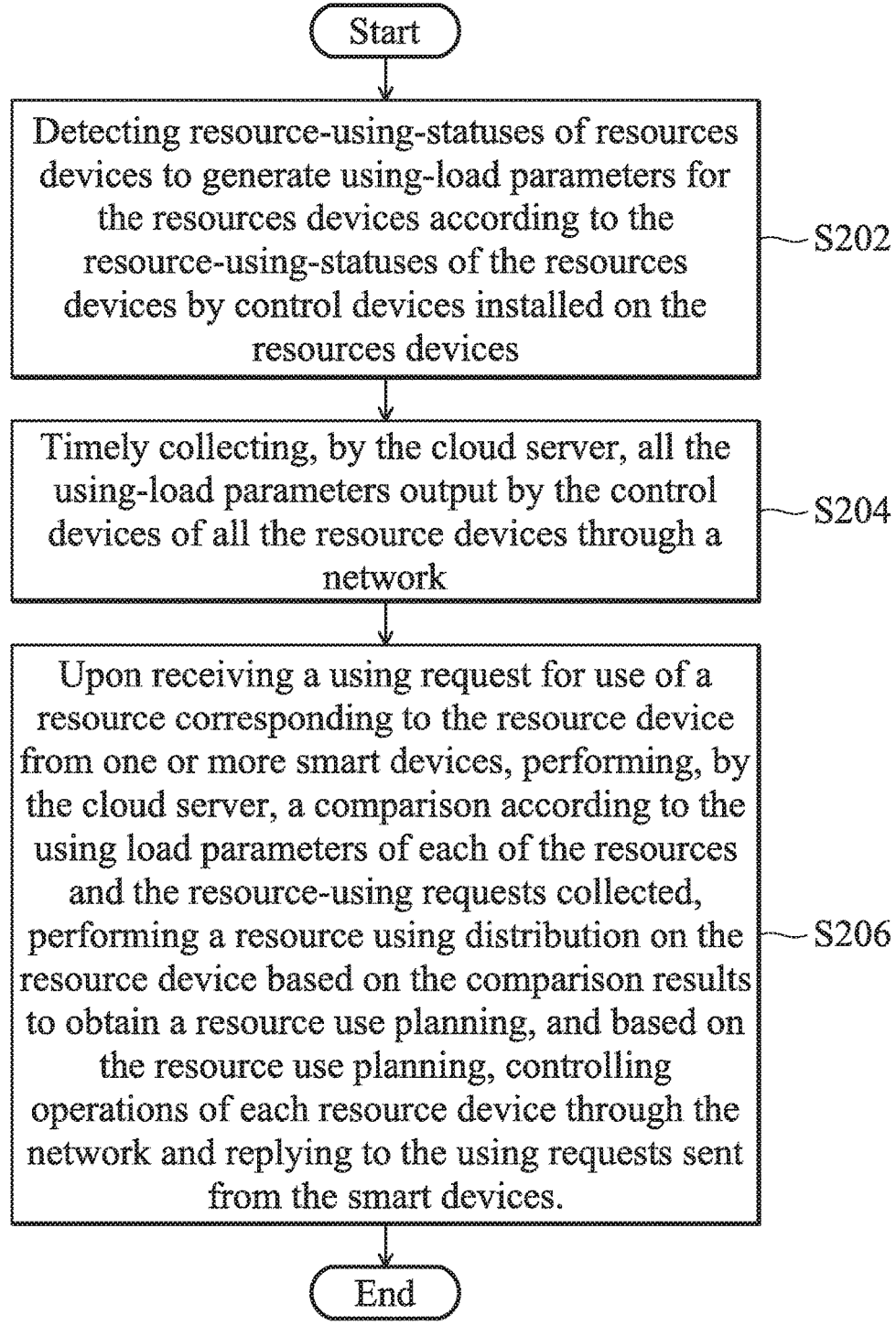
FIG. 2 is a flow chart illustrating a dynamic resource management method according to an embodiment of the invention.

FIG. 2 is a flowchart of an embodiment of a dynamic resource management method of the invention. Please refer to FIGS. 1 and 2. The method for dynamic resource management can be applied to the dynamic resource management system 10 as shown in FIG. 1, which can remotely manage resources of multiple resource devices 300 via the cloud server 200.

First, in step S202, the resource using statuses of all the resource devices are detected by a plurality of control devices (e.g., the resource-control devices 320) configured on each resource device, to generate using load parameters of the resource devices accordingly. For example, when the resource device is an elevator, the resource-control devices 320 in the elevator can periodically detect the using status of the elevator, such as the floor the elevator is in, the number of people in the elevator, etc, and based on the using status of the elevator, using load parameters are generated (e.g. the using load parameters may include the usable resource information of the resource, including the remaining loading capacity of the elevator, the floor, the direction of motion, and so on), and these parameters are reported to the cloud server 200.

Then, in step S204, the cloud server 200 timely collects all the using load parameters output by the control devices of all the resource devices through a network (e.g., the network 400). In other words, the cloud server 200 may obtain every information of each resource, such as other available resource information, such as the remaining loading capacity of the elevator, the floor, the direction of motion and so on, in real-time based on the periodically collected using load parameters of each resource.

Thereafter, in step S206, when receiving a resource-using request for use of a resource corresponding to the resource device above from one or more smart devices, the cloud server 200 performs a comparison according to the using load parameters of each of the resources and the resource-using requests collected, performs a resource using distribution on the resource device based on the comparison results to obtain a resource use planning, and based on the resource use planning, controls operations of each resource device through the network and replies to the using requests sent from the smart devices.

In particular, the appraisal is related to the multiple impact factors corresponding to the accessed resource devices. When the user issues a using request for use of a specific resource, the using request contains information such as resource category, quantity of resources needed, etc. The planning module 240 then performs resource distribution planning based on the using statuses of the resource devices in order to plan the best model that meets the request for use. First, the planning module 240 can carry out status screening based on the resource statuses of each resource device. In particular, the resource statuses may include, Open, Holding, Closed, and so on. Open status indicates that resource is valid and open access to the user. Holding status indicates that the resource is valid and is currently accessible by the user. Closed status indicates that resource is invalid and can't be accessible to the user. Among them, the resource status of each resource device can be obtained by using the related using load parameters.

Moreover, the planning module 240 may normalize every impact factor according to the degree of impact for every impact factor based on the impact factors affecting users' access to resources, including five levels of quantification. The impact factors may include: distance, time, the number of resources requested, cost, depreciation, etc. Normalization consists of several levels of quantification targeting the degree of every impact factor. For example, the distance factor can be divided into five levels based on the distance needed to acquire resources (e.g., very long, long, regular, short and very short). The time factor can be divided into five levels based on the time required to obtain the resources (e.g., very slow, slow, average, fast and very fast). The request factor can be divided into five levels based on the number of resources needed to obtain the resources (e.g., very much, much, normal, little and very little). The cost factor can be divided into five levels based on the cost needed to obtain the resources (e.g., very high, high, average, low and very low). The depreciation factor can be divided into five levels based on current depreciation ratio for the resource obtained (e.g., very new, new, normal, old and very old).

Subsequently, based on the normalization results, the planning module 240 performs weighted average computation to perform a weighted average decision matrix computation based on currently available resources of all the resources device and then sequencing is done based on the above computation results. Further, based on the scoring results, the using requests for use of resources were replied to in sequence, from high to low. See the table one below, which is a schematic diagram illustrating an embodiment of results of the weighted average decision matrix computation of the present invention.

Table one. Weighted average decision matrix computation.

| | Distance | Time | Number of resources needed | Cost | Depreciation | Scores | Rank |
|---|---|---|---|---|---|---|---|
| Resource one | 1 | 3 | 2 | 3 | 2 | $\frac{[(\frac{1}{12})\times 1 + (\frac{3}{15})\times 3 + (\frac{3}{10})\times 2 + (\frac{3}{17})\times 3 + (\frac{2}{15})\times 2]}{5} \cong 0.376$ | 5 |
| Resource two | 3 | 4 | 2 | 2 | 3 | $\frac{[(\frac{3}{12})\times 3 + (\frac{4}{15})\times 4 + (\frac{2}{10})\times 2 + (\frac{2}{17})\times 2 + (\frac{3}{15})\times 3]}{5} \cong 0.610$ | 3 |
| Resource three | 4 | 2 | 1 | 3 | 4 | $\frac{[(\frac{4}{12})\times 4 + (\frac{2}{15})\times 2 + (\frac{1}{10})\times 1 + (\frac{3}{17})\times 3 + (\frac{4}{15})\times 4]}{5} \cong 0.659$ | 2 |
| Resource four | 2 | 5 | 2 | 4 | 5 | $\frac{[(\frac{2}{12})\times 2 + (\frac{5}{15})\times 5 + (\frac{2}{10})\times 2 + (\frac{4}{17})\times 4 + (\frac{5}{15})\times 5]}{5} \cong 1.002$ | 1 |
| Resource five | 2 | 1 | 3 | 5 | 1 | $\frac{[(\frac{2}{12})\times 2 + (\frac{1}{15})\times 1 + (\frac{3}{10})\times 3 + (\frac{5}{17})\times 5 + (\frac{1}{15})\times 1]}{5} \cong 0.567$ | 4 |
| Sum | 12 | 15 | 10 | 17 | 15 | 3.214 | |

In the example as shown in Table one, assume that there are five resource devices available from resource one to resource five, the cloud server 200 may perform a normalization based on the aforementioned impact factors, such as the distance needed to acquire resources, the time required to obtain the resources, the number of resources needed to obtain the resources, the cost needed to obtain the resources and the depreciation ratio for the resource obtained and then generates corresponding scores after normalization. For example, for the impact factor is the "distance", the cloud server may generate scores 1-5 based on the distance of each resource device and the user (for example: based on the signal strength received by the wireless RF device 310 to determine the distance), such as a score "5" indicates a very short distance, a score "1" represents the distance is very long and so on. Finally, the weighted average computation is performed based on the normalized results, and then resources are sorted and allocated based on the computation results. As shown in the example in Table I, due to the comparison score for the resource four has the highest score, so the cloud server 200 will first allocate the resource four for use by the user. Thus, the cloud server 200 outputs command to the resource-control device of the resource four through the command output module 250 to control the operation of the resource device, the resource four, and pushes processing results to the user interface of the smart device through the message pushing module 260 and, displays a delivery result regarding the resource four to the user through the user interface. For example, when the resource four is the number four elevator, the user interface may display a delivery result of "go to the elevator No. 4 please and it is expected to arrive after 1 minute" and other information to the user. The user may then use the resources offered by the resource four to reach its desired needs.

Figure 3:
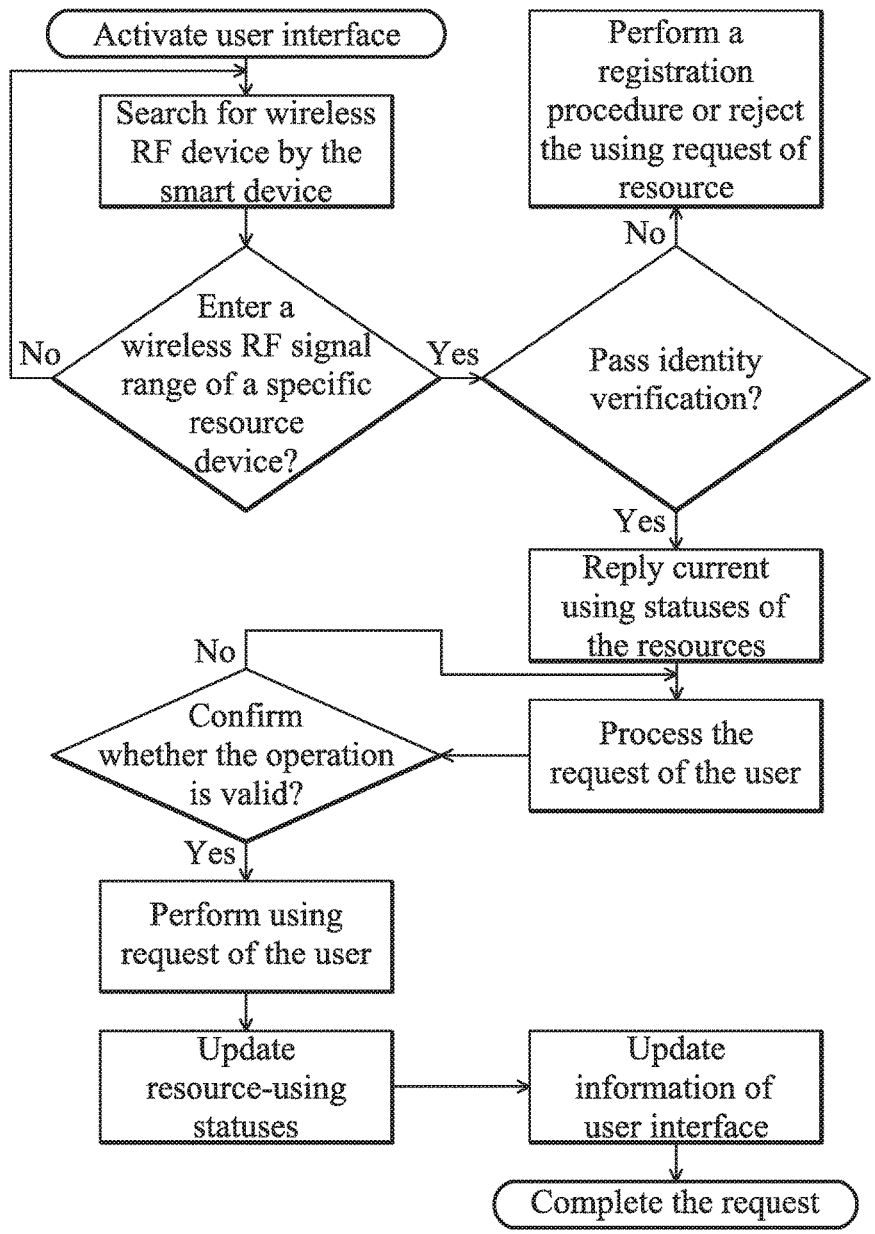
FIG. 3 is a flow chart illustrating a dynamic resource management method according to another embodiment of the invention.

FIG. 3 is a flowchart of an embodiment of a dynamic resource management method of the invention. In this embodiment, a user must first install a user interface 130 such as a mobile App on its smart device 100, register its user account to obtain using authority for use of the resources of the resource device 300, and keep the smart device 100 on a status capable of detecting wireless signals, in order to issue a resource-using request of the invention through the installed mobile app.

After registration, when the smart device with the user interface installed closes proximity of a wireless RF device of a resource device, the smart device receives signals from the wireless RF device, determines the content of its signal, and automatically connects to the cloud when there is a match on the signal content. Specifically, the wireless RF device of each resource device is installed within a fixed range of each resource device, and the wireless RF device may periodically broadcast signals in a fixed time, such as, the signal may include a unique device identification code, such as the Universal Unique Identifier (UUID), for the cloud server to identify the type and the location of the resource device corresponding to the wireless RF device.

When a user handhelds a smart device 100 (e.g., a mobile device) to near the wireless RF device of a specific resource device and enters into its signal coverage range, the smart device receives signals from the wireless RF device, and determine the content of its signal, in which the signal content may include the UUID of the resource device. Once that UUID obtained from the signal content has been previously defined in the mobile app, the processor of the smart device immediately starts the default user interface such as a mobile App to automatically connect to the cloud server for performing identity verification. The cloud server may perform an identity verification procedure to verify whether the user of the smart device has authorization to use the resources provided by the resource device. When the user of the smart device does not have the authorization to use the resources provided by the resource device or the user has not been registered, the cloud server 200 may reject the request for use or execute a registration procedure for registration.

When the user passes the identity verification and connects to the cloud server, the mobile app may include the UUID within the using request and return the using request to the cloud server so that the cloud server can know the current location and requested number of resources based on the UUID and perform resource information delivery to timely deliver relevant information to the mobile device.

Next, the user may submit a using request for the use of resources through the use of the mobile App. When the user clicks on the message for viewing, the mobile app is activated and thus the using request for the use of resources can be submitted via the mobile app. The cloud server may receive the using request from all of the smart devices at the same time and perform calculation to analysis the best mode of resource distribution, expected waiting time for delivery and related information to all of the smart devices.

Thereafter, the cloud server can handle the control commands and transmit them to the resource-control devices, based on the user's location and the router path for obtaining the resource, transmit the commands to the resource-control devices allocated through the API to enable the resource-control devices to process corresponding operations.

The resource-control device may continually report current using status to the cloud servers through the interfaces such as APIs to update its status dynamically. In some embodiments, each resource may be provided with an upper limit of maximum request, and when the resource has reached the upper limit of maximum request, the using requests issued by subsequent users will be suspended. Only users who are using the resources is available to perform other actions, but also notify affected other users.

When the mobile device of the user is away from the signal range, indicating that a waiver of the use of resources, the cloud server can cancel its using request. Unless there are other requests at that position, otherwise the resource-control device is not performed any operation.

When the user has achieved the goal of using resources and is away from the signal transmission range of the wireless RF device, the cloud server 200 may deliver the location information to the mobile app of the smart device corresponding to the user to provide user-friendly browsing of the location information. This information can also be converted to voice, through Bluetooth headsets and other devices that enables users to obtain the location information via voice navigation.

For illustration purpose, some scenarios embodiments are provided in the following paragraphs and the invention is not limited thereto.

In a first embodiment, this method of the invention can be applied in situations where the elevator serves as the resource to be requested for use. Today's elevator systems are generally less user-friendly for the visually impaired. Although some elevators come with speech and Braille keys as aids, it is generally inconvenient for the visually impaired to take the elevator alone. Moreover, there is no way to know how long it takes for the elevator to arrive and whether there is room for extra people. In addition, some people may decide not to take the elevator unexpectedly without cancelling it; therefore, the elevator still opens at a designated floor where no one is around. In some cases, the elevator may be already full, but people are still pressing the button from the outside, and the elevator still opens. Once it opens, the crowdedness is the last thing people in and outside the elevator would want to see. On top of it, this practice is highly inefficient. Furthermore, some people have the tendency to press all operable elevators for their own convenience and simply because they are unsure which elevator would arrive first. This may lead to elevator idling, energy waste, and a reduced elevator lifespan. Worse yet, if an elevator breaks down, the elevator will be suspended and passengers will be trapped in the elevator. As far as elevator waiters or building managers that fail to obtain real-time elevator malfunction information are concerned, incidences of injury will increase.

In summary of the above issues, the dynamic resource management systems and methods can improve people's unidirectional requires for use of elevator resources and responses. Through the cloud computing that optimizes the resource planning and distribution mechanism, the elevator resources can be effectively obtained, while the waiting time can be improved, thereby improving the problem for non-synchronized transmission of information, enhancing elevator resource operation efficiency and energy conservation issues, and carrying out the real-time synchronization of resource statuses.

In this embodiment, the smart device, such as a smart phone, can be used as an installation carrier of elevator app with user interface, which can be connected to the Internet via a WiFi or 3G/4G network, wherein it can detect and receive the signals transmitted by the wireless RF devices and can wakes up the elevator app from the background and unlock the elevator app for use. The elevator app can be used to replace the original elevator control panel, capable of controlling the operation of the elevator, can be wake up by the signals transmitted by the wireless RF devices and can communicate with the cloud server.

The cloud server may accept the using request for use of resources transmitted by the elevator app. The using request is then converted into control commands to control the elevator through the network, specifically API, and receive elevator status reporting information sent to the elevator App to notify users. The cloud server can also summarize the user requests from each floor, which are analyzed to derive at a forecast. The predicted results are then sent to users through the elevator App, while the elevator condition is constantly monitored.

The RF device can continuously launch specific signals. When the smart device receives signals, it means the user of the smart device has entered the elevator range and may need to take the elevator. The elevator can interact with the smart device through this device and determine the distance of the user through the signals. Only the smart device within the signal range can operate the elevator app. The smart device can perform various operations upon entering the signal range of a wireless frequency device or upon leaving the signal range.

The network can serve as a message channeling communication between the cloud server and the smart device and between the cloud server and the elevator. Remote control and elevator information are available only when there is network connection. Without the Internet, the elevator will return to its original panel control mode.

In this example, the resource device is an elevator system, which includes one or more elevators. The elevators can transport users to designated floors, while the management device on the elevator can be connected to the cloud server through the network and that it can control the elevator and periodically detect the elevator using status through the API, such as the floor location of the elevator, the number of people in the elevator, etc. Additionally, based on the elevator using status, using-load parameters are generated (e.g., the using-load parameters include usable resource information of resources, such as the remaining load capacity of the elevator, the floor, direction of motion) and reported back to the cloud server. Users must first visit the cloud server to register and acquire elevator use authorization. Then, the user may propose a request for use, such as a designated floor to go to and the number of people to take the elevator through the pre-installed user interface (i.e. smart device App). The request will be submitted to the cloud server in advance, and then the cloud server can calculate and predict the above-mentioned comparison based on the request for use and resource using-load parameters reported. Then, based on the comparison results, information feedbacks are provided to users. This way, users can have better user experience.

To this end, the elevator becomes an Internet of thing (IOT) device. Elevators (resource) can be operated through a specific App. In particular, the wireless RF device can be installed inside elevators or the elevator entrance on every floor. Only smart devices within the range of the transmission signals of the wireless RF device can operate the elevators. Using requests for use of resources (such as target floor, number of people, and other information) are sent to the cloud server through the mobile App. The cloud server will then summarize and process the above-mentioned information and then send control commands to corresponding resource devices (i.e. elevators) to execute missions. At the same time, a message will be sent to the mobile device to update the user with relevant information, such as which elevator to take, the approximate waiting time, and other information. In some embodiments, the message sent can then be used to provide information prompts (e.g. voice prompts that enable the visually impaired to obtain information) through another mobile device, such as a Bluetooth headphone.

In a second embodiment, the method of the invention can be applied in situations where the using request for use of resource is to find seats in a restaurant. Observations of consumers' dining situations can be summarized into existing problems below: difficulty in finding seats: sometimes the building structure makes it difficult to detect seats; in other times the crowds make it hard to visualize seats from far away; unable to obtain real-time seating statuses: whether or not consumers dining at their seats will leave soon after their meals cannot be known. People can only wait where they are or search back and forth; many people are dining at the same time, thus resulting in inability to send real-time status notifications: When dining with friends, once one of the friends has found seats, they have to shout to get their friends' attention.

According to the dynamic resource management method of the invention, the wireless RF device can be installed in suitable locations of resources under monitor. The wireless RF device is used to detect the number of current diners and their statuses, timely obtain and report all seating information at the floor location, and carry out resource planning and distribution through the cloud server, and timely position and make seating arrangements, thus obtaining planned real-time seating arrangements and positioning. In addition, through the cloud server, the current location is reported to accompanying friends, thereby achieving the purpose of real-time message notification.

Therefore, according to the dynamic resource management systems and methods of the present invention, multiple resources as well as the coordination and planning of requests for use of resources and responses in this case and the effective processing of requests among resources and bulk information analysis through smart devices and cloud server computing can be used to effective, the best resource distribution model can be found. Meanwhile, real-time feedbacks to the user end and the server end status will ensure requests for use of resources are not bound by time and space. Resource operation statuses can be timely obtained, while two-way communication with resource managers can be facilitated, thereby ensuring those with requests for use of resources promptly stays updated with the resources, effectively saving waiting time, and immediately resolving conflicts.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A dynamic resource management method for remote management of resources of resources devices by a cloud server, the method comprising:

detecting, by control devices installed on the resource devices, resource-using-statuses of the resources devices to generate using-load parameters for the resource devices according to the resource-using-statuses of the resource devices;

collecting, by the cloud server, the using-load parameters for the resource devices outputted by the control devices via a network; and upon receiving a using request for use of resources corresponding to the resource devices from at least one smart device, performing, by the cloud server, a comparison according to the using-load parameters for the resource devices and the using request and performing a resource using distribution on the resource devices to obtain a resource-use planning based on the comparison result, thereby automatically determining at least one of the resource devices and sending a control command to the determined resource device to control the operation of the determined resource device based on the resource-use planning to provide resources corresponding to the using request to the smart device and sending a notification message that indicates the determined resource device and the resource-use planning to the smart device via the network, wherein the comparison corresponds to a plurality of impact factors that affect access to the resource devices and the impact factors includes at least one of a distance, a time, a cost and a depreciation ratio corresponding to acquire resources of the resource devices;

the method further comprising:

performing a normalization of the impact factors;

performing a weighted average computation based on a result of the normalization, obtaining a comparison result based on a computation result of the weighted average computation and a resource status of each of the resource devices and sorting the resource devices based on the comparison result; and replying to the resource devices according to the comparison result.

2. The dynamic resource management method of claim 1, further comprising:

performing an identity verification procedure to verify whether a user of the smart device has authorization to use the resources provided by the resource device upon receiving the using request from the at least one smart device and rejecting the using request or executes a registration procedure for registration when the user of the smart device does not have the authorization to use the resources provided by the resource devices.

3. The dynamic resource management method of claim 2, wherein each of the resource devices further periodically broadcasts a wireless signal and the smart device system transmits the using request to the cloud server via the network when detecting the wireless signal broadcasted.

4. The dynamic resource management method of claim 3, wherein the smart device further includes a user interface and the user interface is automatically activated when the wireless signal is detected.

5. The dynamic resource management method of claim 2, further comprising:

updating the resource-using-statuses of the resource devices according to a result of the resource using distribution.

6. The dynamic resource management method of claim 1, wherein the resource status includes at least one of an Open status, a Holding status and a Closed status.

7. A dynamic resource management system, comprising:
at least one smart device;
a plurality of resource devices, providing a plurality of resources, wherein each of the resource devices includes a wireless radio frequency (RF) transceiver and a controller circuit to detect resource-using-statuses of the resource devices to generate using-load parameters for the resource devices according to the resource-using-statuses of the resource devices; and
a cloud server coupled to the smart device and the resource devices via a network, remotely managing the resources of the resource devices,
wherein the cloud server is configured to collect the using-load parameters for the resource devices outputted by the wireless RF transceivers and the controller circuits via the network and upon receiving a using request for use of resources corresponding to the resource devices from the at least one smart device, perform a comparison according to the using-load parameters for the resource devices and the using request and perform a resource using distribution on the resource devices to obtain a resource-use planning based on the comparison result, thereby automatically determining at least one of the resource devices and sending a control command to the determined resource device to control the operation of the determined resource device based on the resource-use planning to provide resources corresponding to the using request to the smart device and sending a notification message that indicates the determined resource device and the resource-use planning to the smart device via the network, wherein the comparison corresponds to a plurality of impact factors that affect access to the resource devices and the impact factors includes at least one of a distance, a time, a cost and a depreciation ratio corresponding to acquire resources of the resource devices;

wherein the cloud server is further configured to:
perform a normalization of the impact factors,
perform a weighted average computation based on a result of the normalization, obtaining a comparison result based on a computation result of the weighted average computation and a resource status of each of the resource devices and sorting the resource devices based on the comparison result; and
reply to the resource devices according to the comparison result.

8. The dynamic resource management system of claim 7, wherein the cloud server further comprises an account verification module for performing an identity verification procedure to verify whether a user of the smart device has authorization to use the resources provided by the resource device upon receiving the using request from the at least one smart device, wherein the account verification module rejects the using request or executes a registration procedure for registration when the user of the smart device does not have the authorization to use the resources provided by the resource devices.

* * * * *